(12) United States Patent
Turner et al.

(10) Patent No.: US 12,480,297 B2
(45) Date of Patent: Nov. 25, 2025

(54) POWER TOOL ADAPTER FOR A DRAIN CLEANING DEVICE

(71) Applicants: Stephen S. Turner, Edelstein, IL (US); Scott I. Turner, Chillicothe, IL (US)

(72) Inventors: Stephen S. Turner, Edelstein, IL (US); Scott I. Turner, Chillicothe, IL (US)

( * ) Notice: Subject to any disclaimer, the term of this patent is extended or adjusted under 35 U.S.C. 154(b) by 424 days.

(21) Appl. No.: 17/970,493

(22) Filed: Oct. 20, 2022

(65) Prior Publication Data

US 2023/0123018 A1 Apr. 20, 2023

Related U.S. Application Data

(60) Provisional application No. 63/316,995, filed on Mar. 5, 2022, provisional application No. 63/257,915, filed on Oct. 20, 2021.

(51) Int. Cl.
| | |
|---|---|
| *E03C 1/302* | (2006.01) |
| *B08B 9/051* | (2006.01) |
| *B23B 45/00* | (2006.01) |
| *E03C 1/264* | (2006.01) |

(52) U.S. Cl.
CPC .............. *E03C 1/302* (2013.01); *B08B 9/051* (2013.01); *B23B 45/003* (2013.01); *E03C 1/264* (2013.01); *B08B 2209/00* (2013.01)

(58) Field of Classification Search
CPC ......... E03G 9/002; E03G 9/005; E03C 1/302; B08B 9/045
See application file for complete search history.

(56) References Cited

U.S. PATENT DOCUMENTS

| | | |
|---|---|---|
| 566,110 A | 8/1896 | Wrigley |
| 984,473 A | 2/1911 | Cornelius |
| 1,051,992 A | 2/1913 | Fisher et al. |
| 1,588,737 A | 6/1926 | Hurd |
| 1,783,256 A | 12/1930 | Miller |
| 2,717,437 A | 9/1955 | De Mestral |
| 4,123,894 A | 11/1978 | Hughes et al. |
| 4,174,548 A | 11/1979 | Dunn |
| 5,231,738 A | 8/1993 | Higashinaka |

(Continued)

FOREIGN PATENT DOCUMENTS

| | | |
|---|---|---|
| CN | 2490219 Y | 5/2002 |
| CN | 103151732 A | 6/2013 |

(Continued)

*Primary Examiner* — Shay Karls
(74) *Attorney, Agent, or Firm* — The Law Office of Patrick F. O'Reilly III, LLC

(57) ABSTRACT

A power tool adapter for a drain cleaning device is disclosed herein. The power tool adapter includes an adapter body having a proximal end portion and a distal end portion, the proximal end portion of the adapter body being oppositely disposed relative to the distal end portion of the adapter body. The distal end portion of the adapter body is configured to be coupled to a drain cleaning device having a plurality of hook elements disposed thereon, the plurality of hook elements configured to grab and collect debris from a drain pipe; and the proximal end portion of the adapter body is configured to be coupled to a rotary motion input device that is sufficient to rotate the plurality of hook elements of the drain cleaning device about a rotational axis so as to grab and collect the debris from the drain pipe.

20 Claims, 14 Drawing Sheets

(56) References Cited

U.S. PATENT DOCUMENTS

| | | |
|---|---|---|
| 5,423,621 A | 6/1995 | Russell |
| 5,669,120 A | 9/1997 | Wessels et al. |
| 5,769,960 A | 6/1998 | Nirmel |
| 5,836,032 A | 11/1998 | Hondo |
| 6,131,229 A | 10/2000 | Lincuna et al. |
| 6,161,371 A | 12/2000 | Glesser |
| 6,775,873 B2 | 8/2004 | Luoma |
| RE38,652 E | 11/2004 | Provost |
| 6,827,794 B2 | 12/2004 | Sommerfeld, Sr. |
| 6,898,807 B2 | 5/2005 | Tash |
| 7,584,513 B2 | 9/2009 | Turner |
| 7,810,176 B2 | 10/2010 | Turner |
| 8,359,696 B1 | 1/2013 | Turner et al. |
| 8,745,771 B2 | 6/2014 | Bates et al. |
| 9,670,656 B2 | 6/2017 | Rutkowski et al. |
| 9,945,108 B1* | 4/2018 | Turner .................. B08B 9/045 |
| 10,047,508 B2 | 8/2018 | Elliott et al. |
| 10,072,405 B2 | 9/2018 | Beck et al. |
| 10,683,648 B2 | 6/2020 | Beck et al. |
| 10,857,577 B2 | 12/2020 | Turner et al. |
| 11,898,338 B2 | 2/2024 | Turner et al. |
| 2003/0044569 A1 | 3/2003 | Kacher et al. |
| 2003/0049407 A1* | 3/2003 | Kacher .................. A47L 13/18 15/228 |
| 2006/0021123 A1 | 2/2006 | Turner |
| 2006/0195994 A1 | 9/2006 | Hung |
| 2012/0005849 A1 | 1/2012 | Tash |
| 2013/0000680 A1 | 1/2013 | Azelton et al. |
| 2013/0014336 A1 | 1/2013 | Bernstein |
| 2014/0325747 A1 | 11/2014 | Gwen |
| 2015/0113748 A1 | 4/2015 | Rutkowski |
| 2016/0081467 A1 | 3/2016 | Vorobyev |
| 2016/0221050 A1 | 8/2016 | Beck et al. |
| 2016/0298325 A1* | 10/2016 | Yu .......................... E03F 9/005 |
| 2017/0130443 A1 | 5/2017 | Mills |
| 2017/0342693 A1 | 11/2017 | Tisch et al. |
| 2018/0066420 A1 | 3/2018 | Beck et al. |
| 2021/0086240 A1 | 3/2021 | Turner et al. |
| 2022/0112703 A1 | 4/2022 | Turner et al. |

FOREIGN PATENT DOCUMENTS

| | | |
|---|---|---|
| CN | 207069443 U | 3/2018 |
| DE | 102010023801 A1 | 12/2011 |
| FR | 3009007 A1 | 1/2015 |
| WO | 2013048088 A1 | 4/2013 |

* cited by examiner

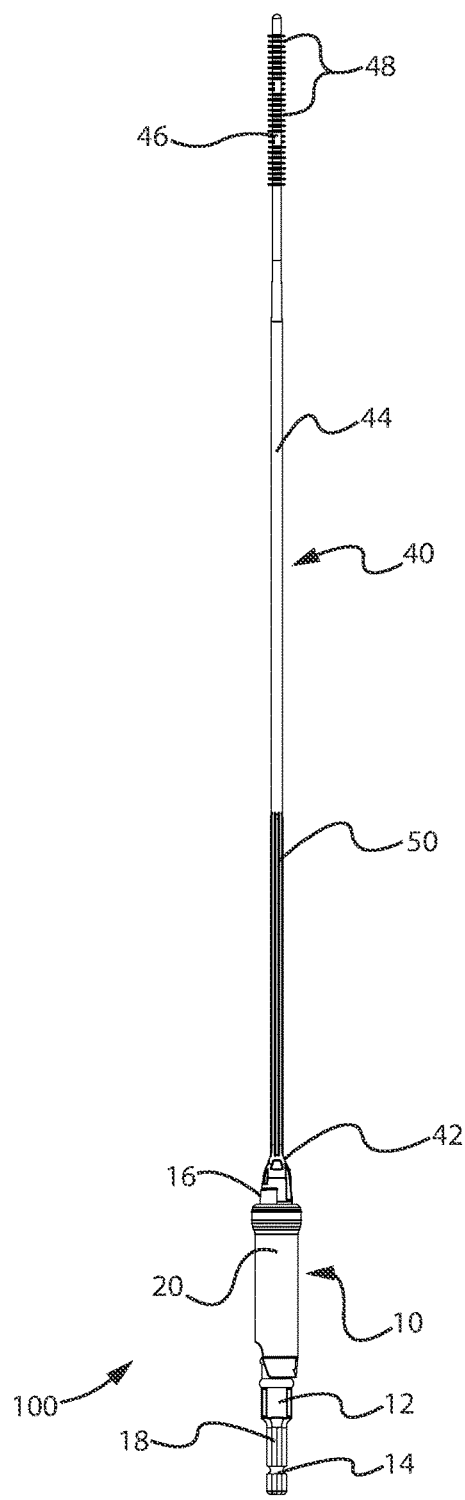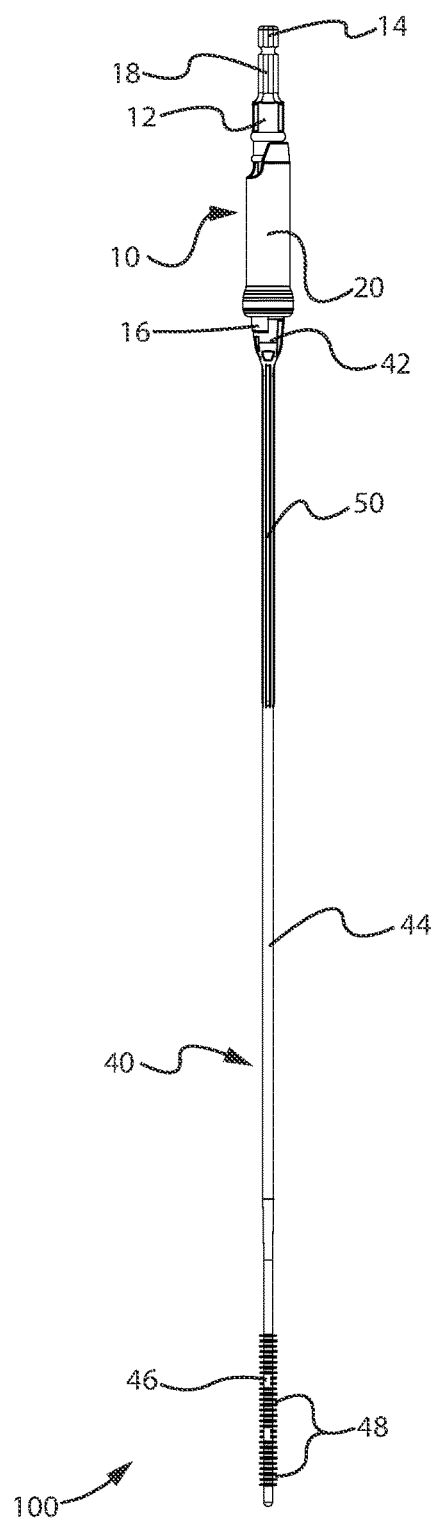
FIG. 2
FIG. 3

Section A-A

Detail A

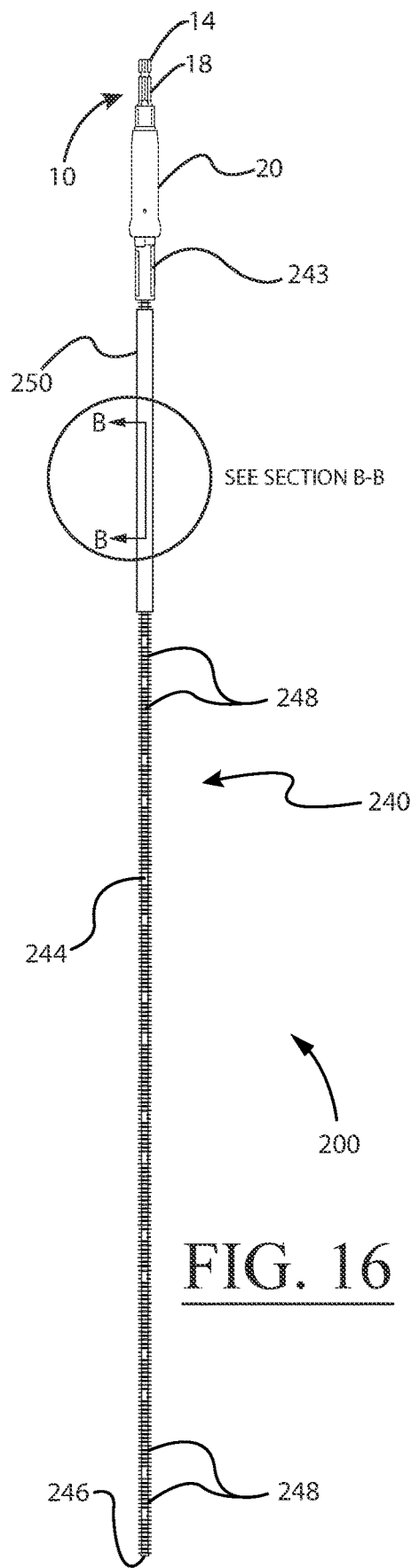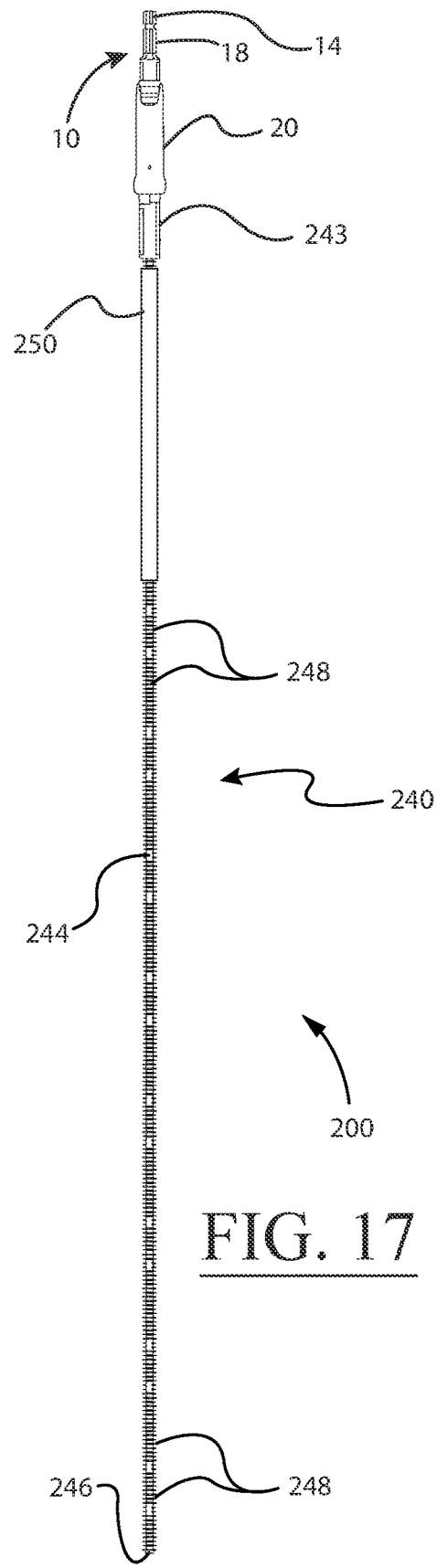
FIG. 16
FIG. 17

Section B-B

POWER TOOL ADAPTER FOR A DRAIN CLEANING DEVICE

CROSS-REFERENCE TO RELATED APPLICATIONS

This patent application claims priority to U.S. Provisional Patent Application No. 63/257,915, entitled "Power Tool Adapter For A Drain Cleaning Device", filed on Oct. 20, 2021, and U.S. Provisional Patent Application No. 63/316,995, entitled "Pipe Cleaning Device", filed on Mar. 5, 2022, the disclosure of each of which is hereby incorporated by reference as if set forth in their entirety herein.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a power tool adapter for a drain cleaning device. More particularly, the invention relates to a power tool adapter that enables a drain cleaning device to be coupled to a rotary motion input device for removing debris from a drain pipe.

2. Background

Bathroom drains are clogged most often by hair that enters the drain and collects from the drain trap at the bottom up to the drain opening. Most frequently, the hair combines with sticky products such as soap, shampoo, and toothpaste and builds a "log-jam" of sorts where these drain obstructions catch the hair, and some settles in the drain trap. After sufficient amounts of hair have collected in the drain trap or around the upper opening, the water from the sink basin begins to drain noticeably more slowly, and eventually can completely block the water from draining. Drain chemicals, home remedies such as baking soda and vinegar and plungers are frequently used for these clogs, but often fail to dissolve or dislodge the hair clogging the drain. In extreme cases, the only remaining remedy is to disassemble the drain or use a device that can effectively reach, snag, and extract the hair (e.g., a drain snake).

Also, liquid or gel-based chemical drain unclogging agents can contain corrosive chemicals that may damage the drain structure. The drain cleaning chemicals may also cause health problems to those who handle the liquids or gels incorrectly. Another problem with chemical agents is that a significant portion of the chemical agent may flow past the hair-clog (for example, in the vertical portion of a bathroom sink drain) such that the chemical cannot effectively submerge the hair in order to completely dissolve it.

In addition, because the hair and other debris may be tightly twisted around the drain structure, it may be difficult to remove this hair and debris manually using a drain snake. The manual removal of this hair and other debris may be particularly difficult for a user that is elderly or disabled.

Therefore, what is needed is a power tool adapter for a drain cleaning device that enables a user to utilize the power of a power tool to clear sink and tub drain clogs, rather than having to manually manipulate the drain snake device by hand.

BRIEF SUMMARY OF EMBODIMENTS OF THE INVENTION

Accordingly, the present invention is directed to a power tool adapter for a drain cleaning device that substantially obviates one or more problems resulting from the limitations and deficiencies of the related art.

In accordance with one or more embodiments of the present invention, there is provided a power tool adapter for a drain cleaning device. The power tool adapter includes an adapter body having a proximal end portion and a distal end portion, the proximal end portion of the adapter body being oppositely disposed relative to the distal end portion of the adapter body. In these one or more embodiments, the distal end portion of the adapter body is configured to be coupled to a drain cleaning device having a plurality of hook elements disposed thereon, the plurality of hook elements configured to grab and collect debris from a drain pipe; and the proximal end portion of the adapter body is configured to be coupled to a rotary motion input device that is sufficient to rotate the plurality of hook elements of the drain cleaning device about a rotational axis so as to grab and collect the debris from the drain pipe.

In a further embodiment of the present invention, the proximal end portion of the adapter body comprises a shank section for being inserted into a recess of the rotary motion input device.

In yet a further embodiment, the rotary motion input device for rotating the drain cleaning device is selected from the group consisting of: (i) a drill, (ii) a screwdriver, (iii) a power drill, and (iv) a power screwdriver.

In still a further embodiment, the shank section at the proximal end portion of the adapter body is in a form of a drill bit shank section for being inserted into a drill chuck recess.

In yet a further embodiment, the drill bit shank section has a generally hexagonal or round cross-sectional shape.

In still a further embodiment, the distal end portion of the adapter body comprises one or more recesses formed therein that are configured to interlock with one or more corresponding protrusions on a proximal end portion of the drain cleaning device.

In yet a further embodiment, the power tool adapter further comprises an adapter sleeve member that is slidable along a length of the adapter body between (i) a disengaged position where the drain cleaning device is able to be released from the power tool adapter, and (ii) an engaged position where the distal end portion of the adapter body is locked into engagement with the proximal end portion of the drain cleaning device.

In still a further embodiment, in the engaged position of the adapter sleeve member, the adapter sleeve member is rotatably disposed about the adapter body, the adapter sleeve member configured to be grasped by a hand of a user during the spinning of the drain cleaning device by the rotary motion input device so as to help stabilize the drain cleaning device, the drain cleaning device being configured to be rotated relative to the adapter sleeve member while the adapter sleeve member is held stationary by the hand of the user.

In yet a further embodiment, the distal end portion of the adapter body comprises a first partial cylinder section and a proximal end portion of the drain cleaning device comprises a second partial cylinder section, the first partial cylinder section on the distal end portion of the adapter body configured to engage with the second partial cylinder section on the proximal end portion of the drain cleaning device such that a generally complete cylinder section is formed.

In still a further embodiment, the distal end portion of the adapter body is configured to be removably coupled to a proximal end portion of the drain cleaning device such that the drain cleaning device is able to be replaced after being used to remove the debris from the drain pipe.

In yet a further embodiment, the drain cleaning device is configured to be discarded after being used to remove the debris from the drain pipe.

In still a further embodiment, the drain cleaning device further comprises an elongated rod section having a first end and a second end, the first end of the elongated rod section being oppositely disposed relative to the second end of the elongated rod section, and the elongated rod section further includes the plurality of hook elements projecting outwardly from the elongated rod section, the plurality of hook elements being disposed at least partially around a periphery of the elongated rod section and along at least a portion of a length of the elongated rod section between the first end and the second end.

In yet a further embodiment, the elongated rod section further comprises a central core portion and an outer covering bonded to the central core portion, the outer covering formed from a hook material strip, the hook material strip comprising the plurality of hook elements of the elongated rod section, and the hook material strip being made from a hook side of a hook-and-loop fastener material.

In still a further embodiment, the plurality of hook elements on the elongated rod section comprise a plurality of injection-molded micro-hooks.

In yet a further embodiment, at least some of the plurality of injection-molded micro-hooks are in the form of inverted J-shaped projections protruding outwardly from a central core portion of the elongated rod section of the drain cleaning device.

In still a further embodiment, at least some of the plurality of injection-molded micro-hooks are in the form of T-shaped projections protruding outwardly from a central core portion of the elongated rod section of the drain cleaning device.

In yet a further embodiment, the drain cleaning device further comprises an elongated sleeve member rotatably disposed on a longitudinal portion of the elongated rod section, the elongated sleeve member configured to be grasped by a hand of a user during the spinning of the drain cleaning device by the rotary motion input device so as to help stabilize the drain cleaning device, the drain cleaning device being configured to be rotated relative to the elongated sleeve member while the elongated sleeve member is held stationary by the hand of the user.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which:

FIG. 2 is a first side elevational view of the drain cleaning assembly of FIG. 1;

FIG. 3 is a second side elevational view of the drain cleaning assembly of FIG. 1;

FIG. 16 is a front elevational view of the drain cleaning assembly of FIG. 15;

FIG. 17 is a rear elevational view of the drain cleaning assembly of FIG. 15;

Throughout the figures, the same parts are always denoted using the same reference characters so that, as a general rule, they will only be described once.

DETAILED DESCRIPTION OF EMBODIMENTS OF THE INVENTION

Figure 1:
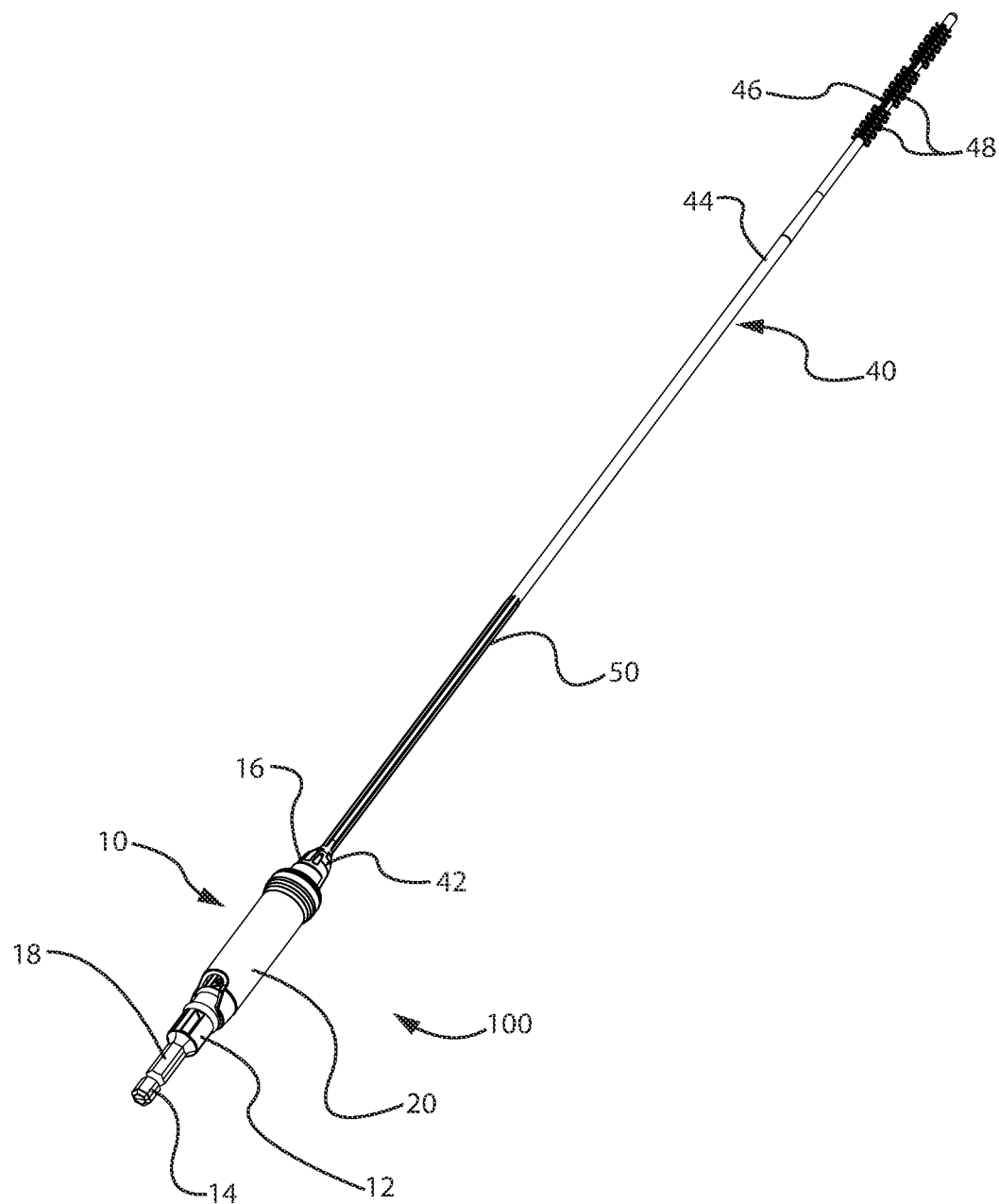
FIG. 1 is a perspective view of a drain cleaning assembly, according to a first illustrative embodiment of the invention, wherein the drain cleaning assembly includes a power tool adapter and a first type of drain cleaning device.
Figure 4:
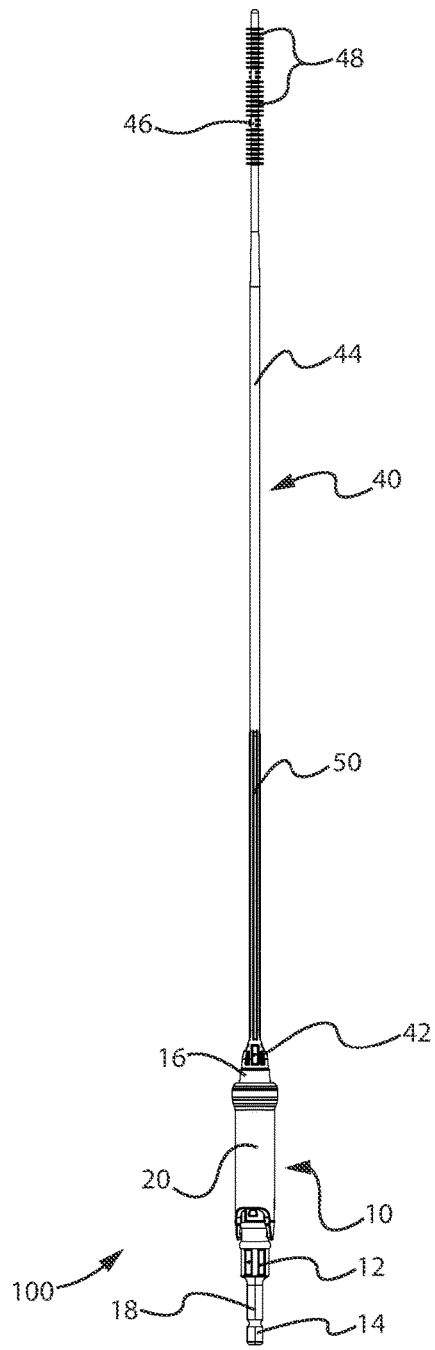
FIG. 4 is a rear elevational view of the drain cleaning assembly of FIG. 1.

A first illustrative embodiment of a drain cleaning assembly is seen generally at 100 in FIGS. 1-7. FIG. 1 shows a perspective view of the illustrative drain cleaning assembly 100 including a reusable power tool adapter 10 and a disposable drain cleaning device 40. The disposable drain cleaning device 40 is attached to the power tool adapter 10 by engagement of the proximal end portion 42 (i.e., the end that is closest to the person when operating the device) of the drain cleaning device 40 fully engaged with the distal end portion 16 of the power tool adapter 10. A slidable sleeve member 20 is shown in the engaged position and the drain cleaning device 40, as shown in FIG. 1, is in the fully engaged configuration. The sleeve member 20 in this engaged position ensures that the drain cleaning device 40 and power tool adapter 10 are fully engaged, i.e., interlocked at their corresponding ends, and the device is ready for use, such as for clearing a clogged drain pipe or for other similar pipe-cleaning functions.

In the illustrative embodiment, as shown in FIGS. 1-5 and 11, the power tool adapter 10 generally comprises an adapter body 12 having a proximal end portion 14 and a distal end portion 16, the proximal end portion 14 of the adapter body 12 being oppositely disposed relative to the distal end portion 16 of the adapter body 12. In FIGS. 1-5, it can be seen that the distal end portion 16 of the adapter body 12 is configured to be coupled to a drain cleaning device 40 having a plurality of hook elements 48 disposed thereon, the plurality of hook elements 48 configured to grab and collect debris from a drain pipe. Also, as shown in FIGS. 1-5, the proximal end portion 14 of the adapter body 12 is configured to be coupled to a rotary motion input device (e.g., a drill 70—see FIGS. 8A-8D) that is sufficient to rotate the plurality of hook elements 48 of the drain cleaning device 40 about a rotational axis so as to grab and collect the debris from a drain pipe 88 (refer to FIG. 9).

In the illustrative embodiment, as shown in FIGS. 1-5 and 8A, it can be seen that the proximal end portion 14 of the adapter body 12 of the power tool adapter 10 comprises a shank section 18 for being inserted into a recess of the rotary motion input device (e.g., a drill 70). For example, the rotary motion input device for rotating the drain cleaning device 40 may comprise a drill, a screwdriver, a power drill, or a power screwdriver. In the illustrative embodiment, the power tool adapter 10 is configured for use with a drill 70, and the shank section at the proximal end portion of the adapter body is in a form of a drill bit shank section 18 for being inserted into a drill chuck recess. In the illustrative embodiment of FIGS. 1-5 and 8A, the drill bit shank section 18 has a generally hexagonal cross-sectional shape for being inserted into the drill chuck recess. In another embodiment, the drill bit shank section may have a generally circular cross-sectional shape for being inserted into the drill chuck recess.

In the illustrative embodiment, as will be described in further detail hereinafter, a user inserts the drill bit shank section 18 into a drill and tightens the chuck in the same fashion as using a drill bit. The slidable sleeve member 20 moves axially along the center of the power tool adapter 10 between an engaged position (i.e., a locking position) and a disengaged position (i.e., a release position). This sliding action of the sleeve member 20 fully engages or releases the replaceable drain cleaning device 40, which attaches to the distal end portion 16 of the adapter body 12. Once the drill bit shank section 18 of the power tool adapter 10 is locked into the drill chuck, the user grasps the drill in one hand and the spinning sleeve member 20 with the other hand, and inserts the attached drain cleaning device 40 into a sink or tub drain until they engage the resistance of a clog. Then, rather than having to manually crank the device 40, the user simply runs the drill on slow speed and allows the drill to power the drain cleaning device 40, rather than using the effort of manually cranking the device 40. The user can then detach the removable drain cleaning device 40 by sliding the spinning sleeve 20 of the power tool adapter 10 up toward the proximal drill end, exposing the mated, interlocking ends of both the adapter 10 and removable drain cleaning device 40, thereby allowing for removal and replacement of the drain cleaning device 40.

In the illustrative embodiment, the sleeve member 20 of the power tool adapter 10 can be moved back and forth between two possible positions along the adapter body 12: (i) a disengaged position (see FIGS. 12 and 13) where the drain cleaning device 40 is able to be released from the power tool adapter 10, and (ii) an engaged position (see FIGS. 1-5) where the distal end portion 16 of the adapter body 12 is locked into engagement with the proximal end portion 42 of the drain cleaning device 40.

As shown in FIGS. 1-5 and 7, the distal tip section 46 of the drain cleaning device 40 can be equipped with a hair-catching structure (e.g., a plurality of hook elements 48) that collects hair material or debris clogging a drain.

After use, the drain cleaning device 40 is disengaged from the power tool adapter 10 (as described below) and can be discarded in an appropriate disposal receptacle, or in an appropriate recycling collection container.

Figure 11:
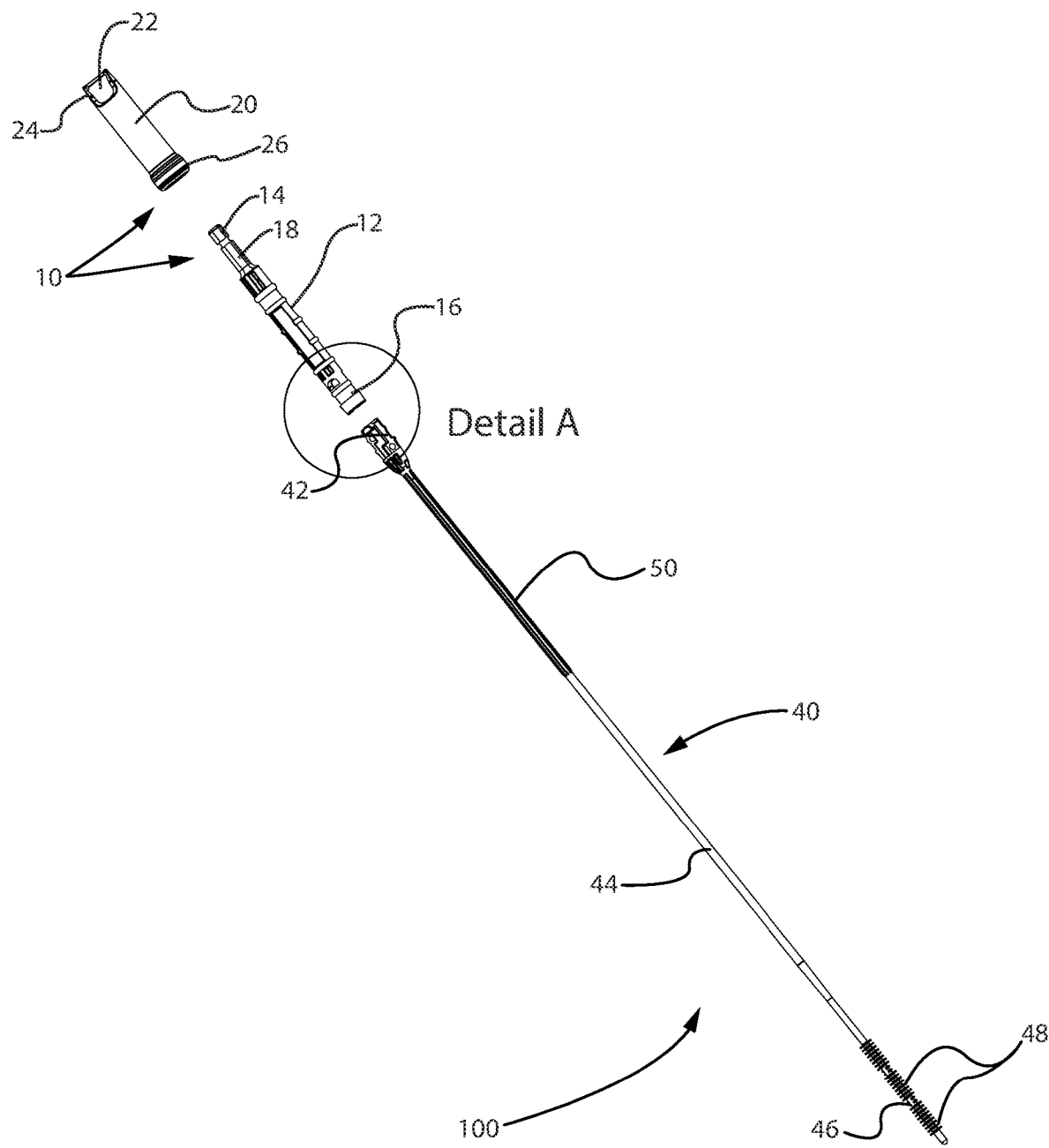
FIG. 11 is an exploded perspective view of the drain cleaning assembly of FIG. 1.
Figure 14:
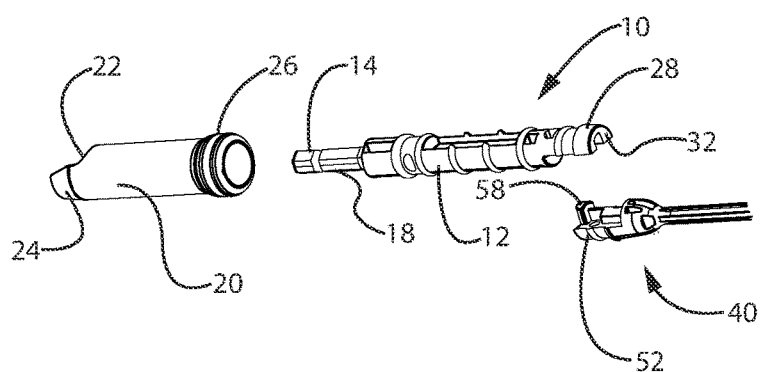
FIG. 14 is an enlarged exploded perspective view of the power tool adapter and the proximal end portion of the drain cleaning device.

In the illustrative embodiment, the sleeve member 20 of the power tool adapter 10 has a generally cylindrical shape, but may include a notch 22 at its proximal end 24 (see FIGS. 11 and 14). When the sleeve member 20 is moved backward to its disengaged position (i.e., the FIG. 8B position), the interlocking ends of the drain cleaning device 40 and power tool adapter 10 are exposed and can be detached.

Figure 8A:
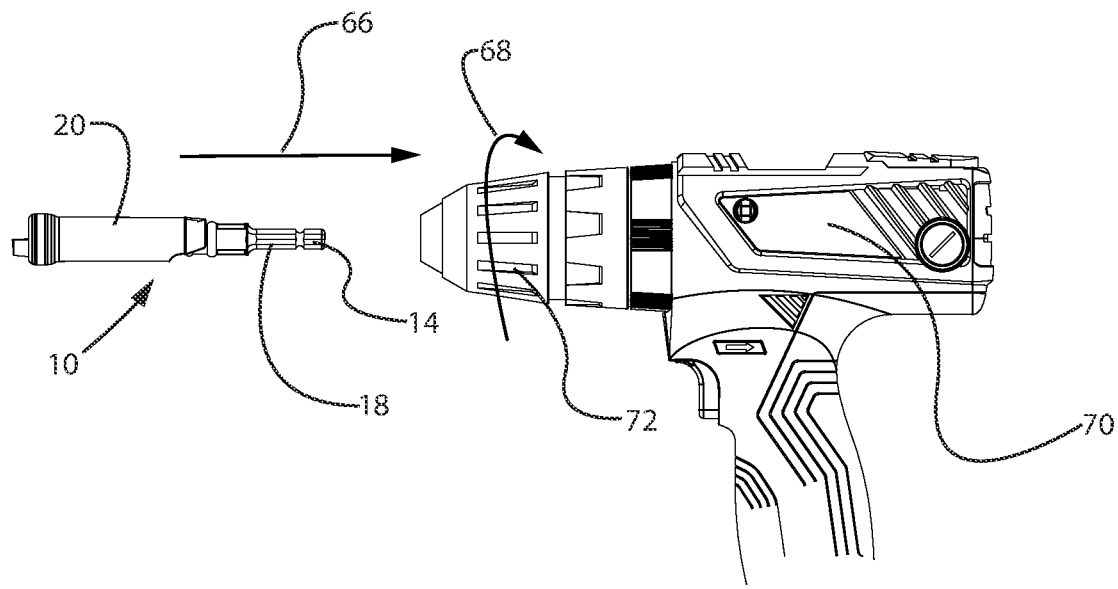
FIG. 8A is a side view illustrating the manner in which the power tool adapter is inserted into a drill.
Figure 8B:
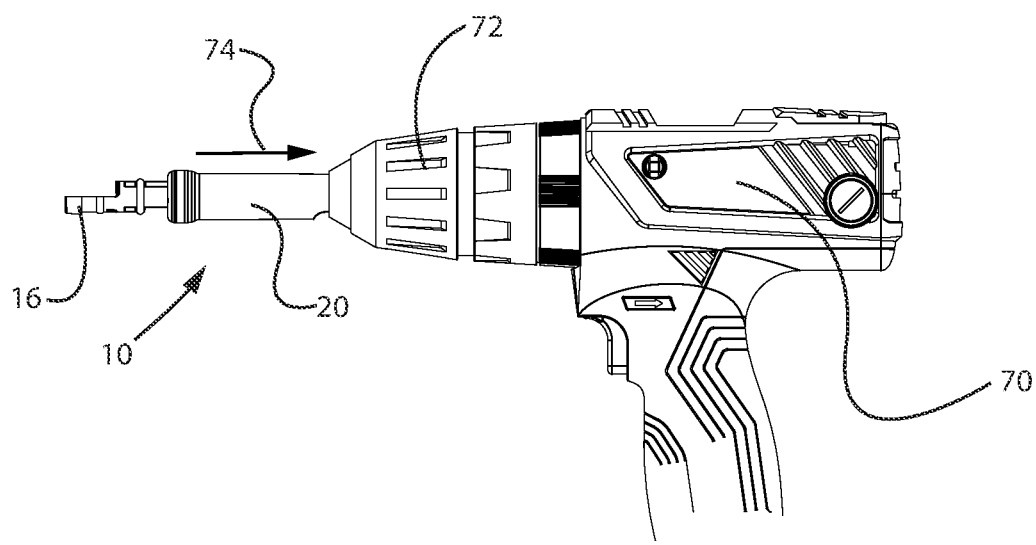
FIG. 8B is another side view illustrating the manner in which the sleeve member of the power tool adapter is moved into a disengaged position.
Figure 8C:
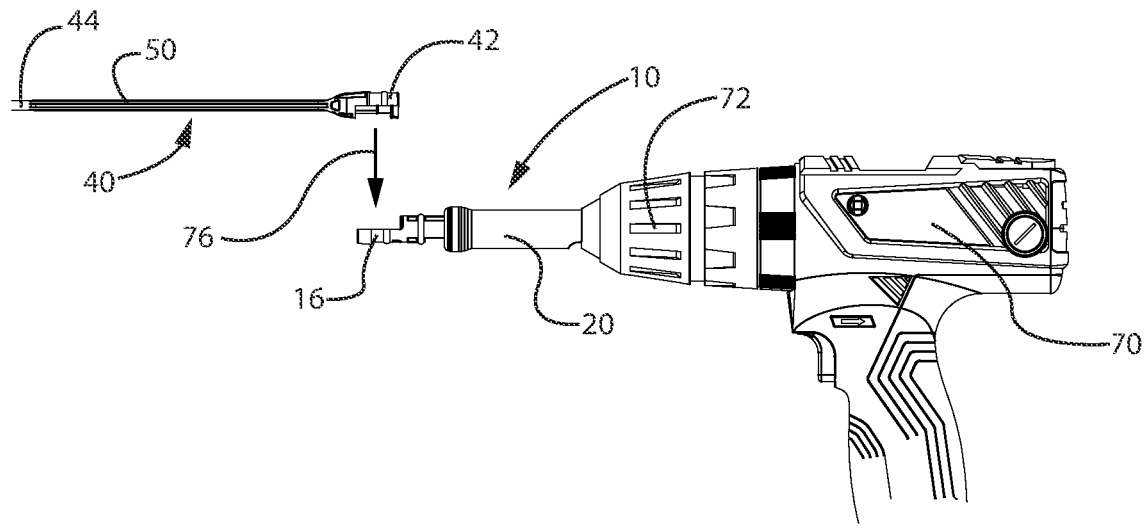
FIG. 8C is yet another side view illustrating the manner in which the drain cleaning device is engaged with the power tool adapter.
Figure 12:
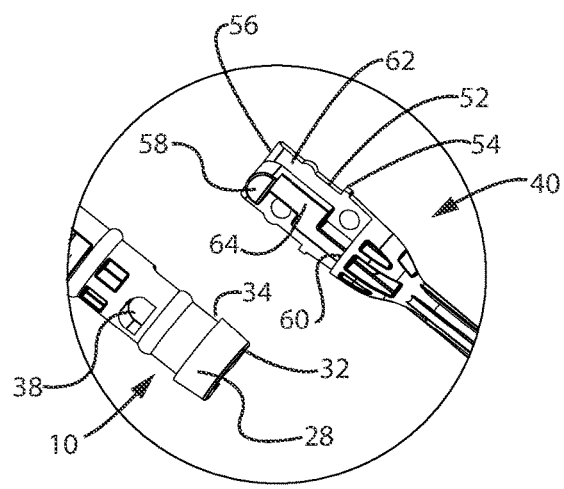
FIG. 12 is an enlarged perspective view of the distal end portion of the power tool adapter and the proximal end portion of the drain cleaning device (Detail "A" from FIG. 11), wherein the drain cleaning device is shown detached from the power tool adapter.
Figure 13:
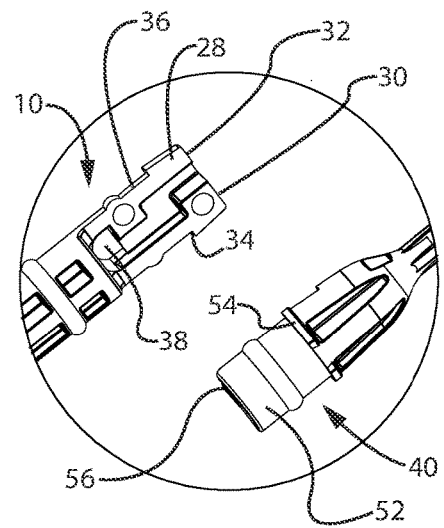
FIG. 13 is another enlarged perspective view of the distal end portion of the power tool adapter and the proximal end portion of the drain cleaning device, wherein the drain cleaning device is shown detached from the power tool adapter, similar to FIG. 12.

In the illustrative embodiment, the interlocking region at the proximal end of the drain cleaning device 40 includes a partial annular shoulder stop 54 and a partial cylindrical end section 52 that match a respective partial annular shoulder stop 34 and partial cylindrical end section 28 at the distal end of the power tool adapter 10 (see FIGS. 12 and 13). When the sleeve member 20 is moved to the disengaged position as shown in FIG. 8B, the two corresponding partial cylindrical portions 28 and 52, are exposed and can be decoupled or detached. Alternatively, when the sleeve member 20 is moved to the engaged position (see FIGS. 1-5 and 8D), the distal end 26 of the sleeve member 20 is moved axially forward until it rests against the two partial annular shoulder stops, 34 and 54. When a drain cleaning device 40 is engaged, i.e., its proximal end portion 42 is interlocked with the distal end portion 16 of the power tool adapter body 12, the sleeve member 20 can be moved to its engaged position and the drain cleaning device 40 is ready for use and can be properly operated.

The interlocking region of the drain cleaning device 40 and the power tool adapter 10 is shown in more detail in the illustrative embodiment of FIGS. 12 and 13.

When sleeve member 20 is moved to its disengaged position, the drain cleaning device 40 can be disengaged from the distal end portion 16 of the power tool adapter 10. In this position, the partial cylindrical end section 28 at the distal end of the power tool adapter 10 is clearly exposed (see FIG. 8B).

When interlocked with the corresponding end of the drain cleaning device 40, the partial cylindrical end section 52 of the drain cleaning device 40 combines with the partial cylindrical end section 28 at the distal end of the power tool adapter 10 to form a generally cylindrical interlocked structure that fits inside the bore of the sleeve member 20; and this interlocked structure can rotate inside the sleeve member 20 (e.g., during routine operation) when the sleeve is moved to the engaged position.

In addition, in the illustrative embodiment shown in FIGS. 1-5, when the drain cleaning device 40 is interlocked with the power tool adapter 10, protrusion 58 (see FIG. 12) of the drain cleaning device 40 fits in the corresponding opening 38 (see FIGS. 12 and 13), and axial stop 60 and surfaces 62 and 64 of the proximal end of the drain cleaning device 40 fit in the corresponding stop 32 and surfaces 30 and 36 at the distal end of power tool adapter 10 (refer to FIGS. 12-14).

In the illustrative embodiment, a further shaped axial stop surface 56 is provided at the proximal end of the drain cleaning device 40 (see FIGS. 12 and 13), which matches a correspondingly shaped cavity or opening (in axially proximal surface of opening 38) in the distal end of the power tool adapter 10 to ensure a uniquely matched interlock between the drain cleaning device 40 and the power tool adapter 10. That is, as best shown in FIGS. 12 and 13, the partial cylindrical end section 52 of the drain cleaning device 40 is provided with an internal zigzag protruding surface 64 that interlocks with an internal zigzag recess in the partial cylindrical end section 28 of the power tool adapter 10 connected to opening 38.

In the illustrative embodiment, a further detent can be provided at the distally lower surface of protrusion 58 to engage with a corresponding receiving indentation in the radially outer portion of opening 38 in the power tool adapter 10, in order to ensure a snap fit or other secure attachment.

In the illustrative embodiment, contact surface 62 at the distal end of the drain cleaning device 40 mates with corresponding contact surface 36 at the distal end of power tool adapter 10, when the drain cleaning device 40 and power tool adapter 10 are fully engaged. Similarly, when engaged, axial stop surface 60 at the end of the drain cleaning device 40 mates with the corresponding adapter stop surface 32. Furthermore, any tab feature, as shown projecting from surface 36 of the distal end of the power tool adapter 10, can be provided to mate with a corresponding opening in the proximal end of the drain cleaning device 40.

However, it is noted that the combination of the protrusion 58 and corresponding opening 38, as well as other notch-opening relationships between the proximal end of the drain cleaning device 40 and the distal end of the power tool adapter 10 are exemplary of mating relationships that can vary in size and shape. It is most important that the mating contours of the proximal end of the drain cleaning device 40 and the corresponding distal end of the power tool adapter 10 match in a manner that ensures the adequate transmission of the torque produced by the power tool (e.g., the drill 70 in FIG. 9) to the distal tip section 46 of the drain cleaning device 40 without loosening or disengaging the two interlocked ends during use. It is also important that different reusable power tool adapters 10 be provided with unique mating contours at the interlocking end section to match drain cleaning devices 40 that are uniquely matched to mate and interlock with the reusable power tool adapter 10.

The particular contour of the matching shaped protrusion of the drain cleaning device 40 and shaped opening of the power tool adapter 10, ensure that a unique drain cleaning device 40 can be uniquely engaged with a correspondingly unique power tool adapter 10.

A kit containing a set of differently shaped drain cleaning devices, each with a correspondingly matched power tool adapter 10, can be used, so long as the interlocking ends are suitably matched and the rotation of the power tool adapter 10 can cause the rotation of the drain cleaning device to remove debris from piping structures. Different kits can contain drain cleaning devices that are matched to one unique power tool adapter 10, or to more than one power tool adapter in different kits. The drain cleaning devices in any individual kit have interlocking portions with proximal contours that match the corresponding contours of the interlocking portions of the power tool adapters in the individual kits.

In the illustrative embodiment, with reference to FIGS. 1-5, it can be seen that the drain cleaning device 40 generally comprises an elongated rod section 44 with a plurality of longitudinally extending ribs 50 disposed along a length thereof, the plurality of longitudinally extending ribs 50 configured to add structural rigidity to the elongated rod section 44, and the plurality of longitudinally extending ribs 50 further configured to facilitate the cleaning of grime from a side of a drain pipe 90 (see FIG. 9); and a tip section 46 connected to the elongated rod section 44, the tip section 46 including a plurality of hook elements 48 disposed thereon (see FIGS. 1-5), the plurality of hook elements 48 configured to grab and collect debris from the drain pipe 90.

Figure 10:
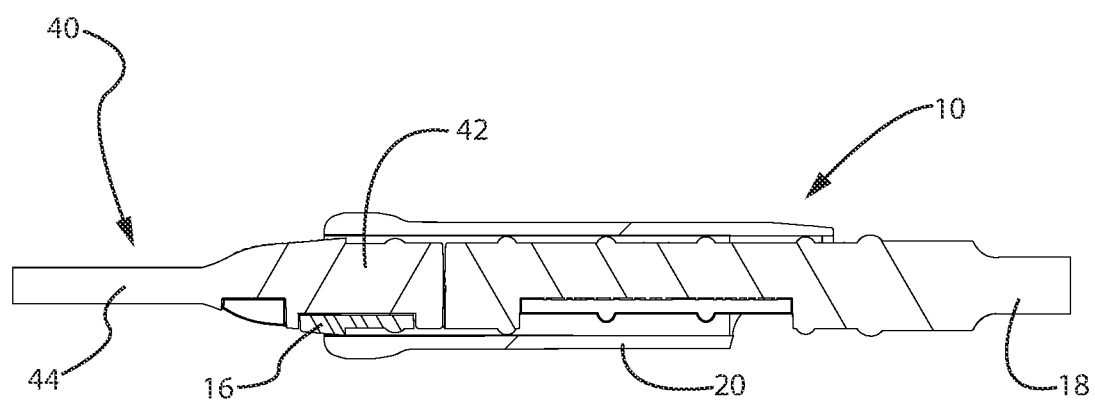
FIG. 10 is a longitudinal sectional view cut through the distal end portion of the power tool adapter and the proximal end portion of the drain cleaning device so as to illustrate the engagement between the power tool adapter and the drain cleaning device, wherein the section is generally cut along the cutting-plane line A-A in FIG. 5.

In the illustrative embodiment, the plurality of hook elements 48 of the tip section 46 are in the form of a plurality of injection-molded micro-hook elements configured to grab and collect the hair and/or debris from the drain pipe being cleaned. In the illustrative embodiment, the plurality of injection-molded micro-hook elements may be in the form of inverted J-shaped projections and T-shaped projections protruding outwardly from the elongated body of the cleaning device 40. The plurality of injection-molded micro-hook elements may be disposed on opposite first and second sides of the elongated body of the cleaning device 40. The injection-molded micro-hook inverted J-shaped elements that are disposed on the first side and the second side of the elongated body of the cleaning device may be arranged in rows where every other injection-molded micro-hook element points in an opposite direction (i.e., the injection-molded micro-hook elements point in alternating directions along the length of the elongated body—see e.g., FIGS. 10-12 in U.S. Pat. No. 10,857,577, the entire disclosure of which is incorporated herein by reference).

Figure 5:
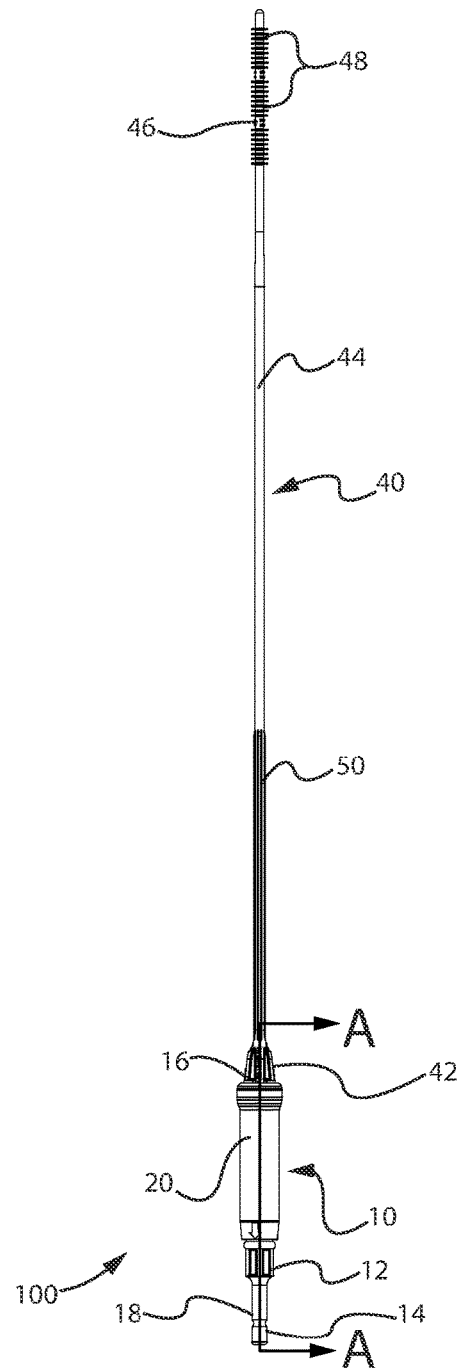
FIG. 5 is a front elevational view of the drain cleaning assembly of FIG. 1.
Figure 6:
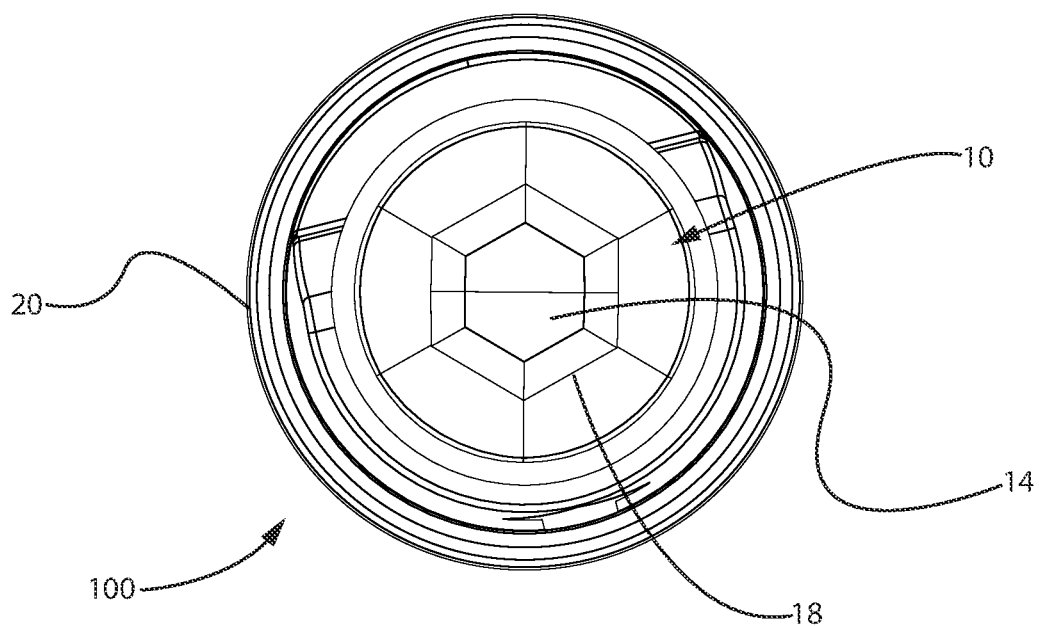
FIG. 6 is a first end view of the drain cleaning assembly of FIG. 1.
Figure 7:
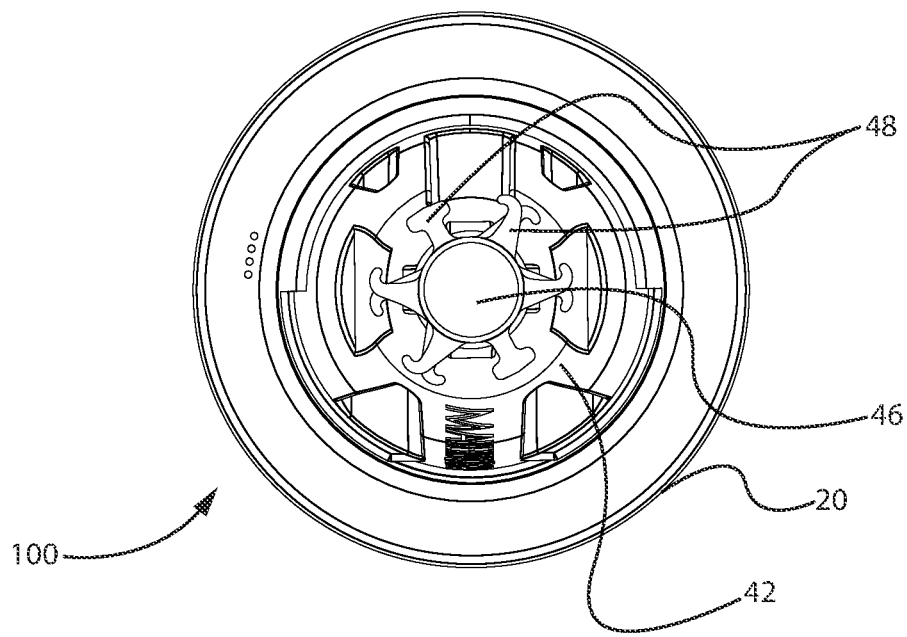
FIG. 7 is a second end view of the drain cleaning assembly of FIG. 1.
Figure 9:
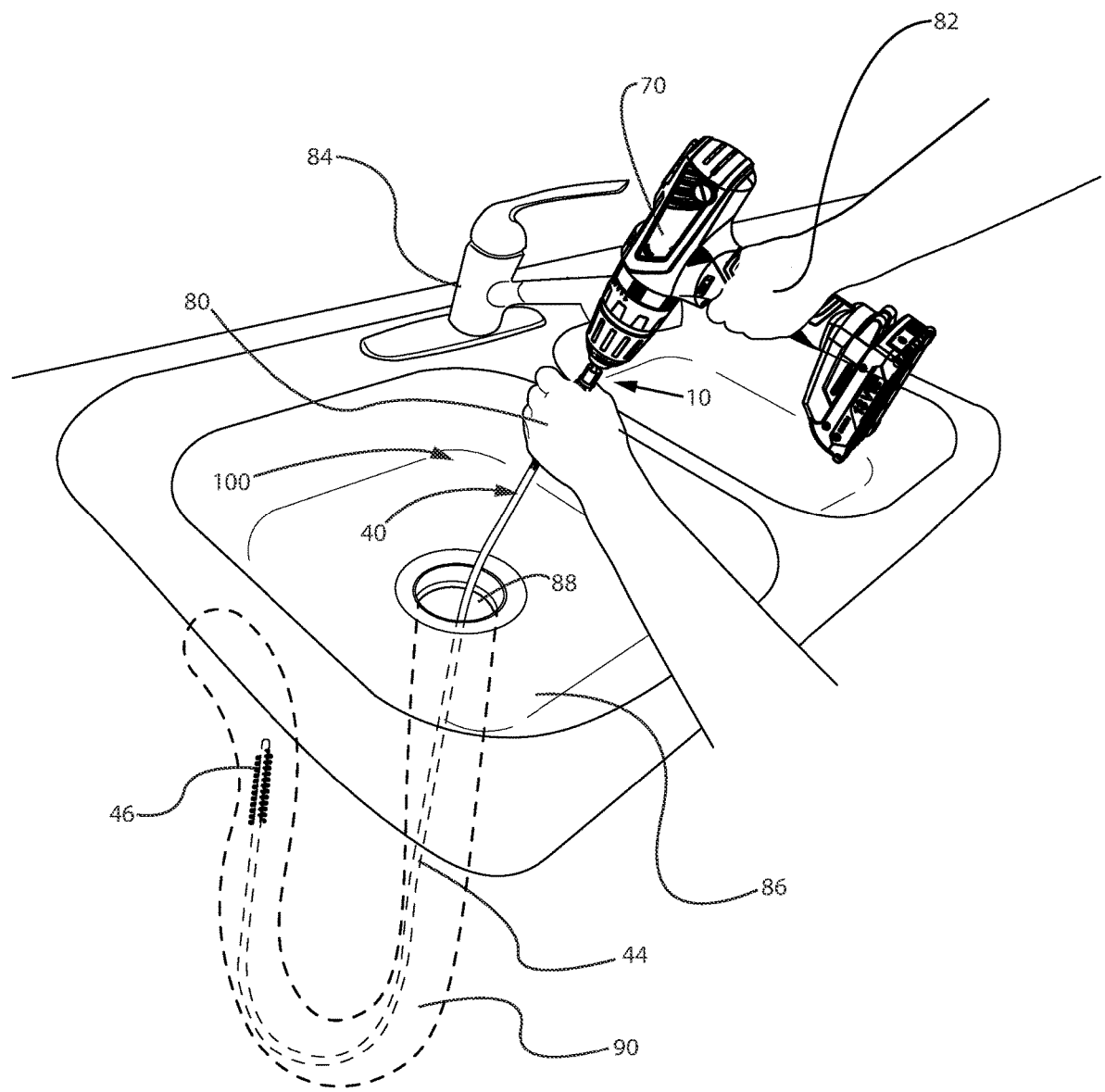
FIG. 9 is a perspective view illustrating the manner in which the drain cleaning assembly of FIG. 1 may be used to clean a drain pipe of a sink drain.

In other embodiments, the plurality of hook elements of the drain cleaning device 40 may comprise a hook material strip 30 (e.g., made from the hook portion of Velcro®—see e.g., FIGS. 5 and 9 of U.S. Pat. No. 10,857,577), rather than being injection-molded micro-hook elements.

In the illustrative embodiment, the drain cleaning devices 40 are preferably disposable and can be made of any suitable disposable, recyclable or biodegradable material (e.g., a suitable plastic), such as polyethylene, polystyrene, polycarbonate, acrylic polymer, or nylon. The power tool adapter 10 is preferably reusable and can be made of a suitably durable material (e.g., a suitable plastic) to withstand repeated engagement and disengagement with drain cleaning devices 40 and repeated use.

Now, with reference to the illustrative embodiment of FIGS. 8A-8D, the manner in which the drain cleaning assembly 100 is attached to a driving power tool (e.g., a drill 70) will be explained. First of all, as shown in FIG. 8A, the drill bit shank section 18 of the power tool adapter 10 is inserted into the chuck 72 of the battery-powered drill 70 by a user (as diagrammatically indicated by the horizontal arrow 66), and then the user tightens the jaws of the drill chuck 72 onto the drill bit shank section 18 of the power tool adapter 10 using the tightening collar of the chuck 72 (as diagrammatically indicated by the curved arrow 68). Secondly, as shown in FIG. 8B, the user slides the sleeve member 20 into its disengaged position (as diagrammatically indicated by the horizontal arrow 74). Then, turning to FIG. 8C, the user engages the proximal end portion 42 of the drain cleaning device 40 with the distal end portion 16 of the power tool adapter 10 (as diagrammatically indicated by the vertical arrow 76). Finally, once the proximal end portion 42 of the drain cleaning device 40 is engaged with the distal end portion 16 of the power tool adapter 10, the user slides the sleeve member 20 into its engaged position (as diagrammatically indicated by the horizontal arrow 78) so as to secure the drain cleaning device 40 to the power tool adapter 10.

Figure 8D:
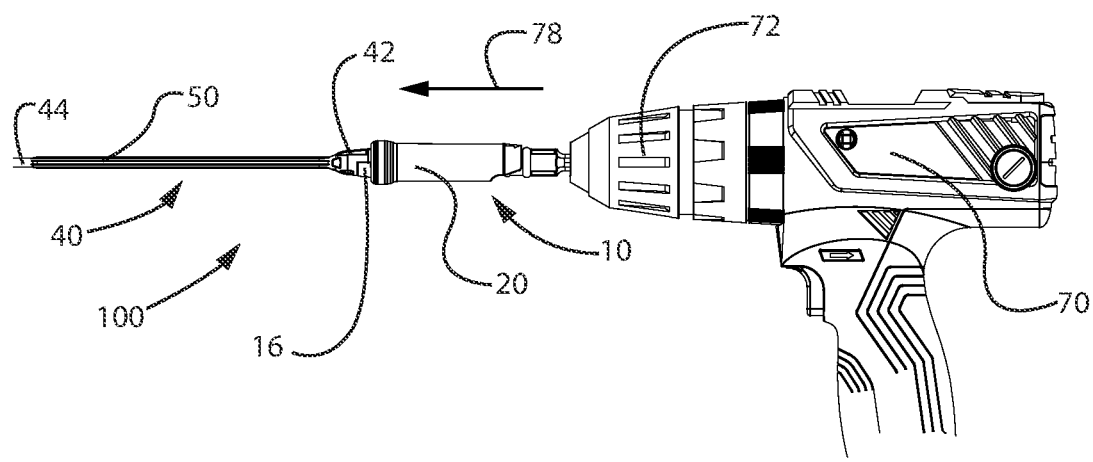
FIG. 8D is still another side view illustrating the manner in which the sleeve member of the power tool adapter is moved into a engaged position so as to lock the drain cleaning device into engagement with the power tool adapter.

When the drain cleaning assembly 100 is in the fully engaged configuration as shown in FIG. 8D, the drain cleaning assembly 100 is ready for use. The distal tip section 46 of the drain cleaning device 40 can be inserted into a clogged drain or other similarly obstructed pipe. The user then places one hand 80 on the sleeve member 20 of the power tool adapter 10 and uses the other hand 82 to hold the drill 70. Pressing the trigger on the drill 70 causes the drain cleaning device 40 to rotate inside the clogged drain or obstructed pipe, thereby removing obstructing materials. The power tool adapter 10 can be turned indefinitely to rotate the drain cleaning device 40, thereby continuously collecting debris at the distal end of the drain cleaning device 40.

In FIG. 9, the operation of the drain cleaning assembly 100 is illustrated. More specifically, FIG. 9 shows the inventive drain cleaning assembly 100 being used in a sink 86 to remove clogging debris from the drain pipe 90 of the sink 86. The sink 86 has an associated faucet 84 for dispensing water into the sink 86. In the illustrative embodiment, the diameter of the elongated rod section 44 of the device 40 is sufficiently narrow to be easily inserted through openings in a typical drain cover all the way to the drain trap, often found in older residential bathrooms or modern drains having pop-up stoppers. Referring again to FIG. 9, after insertion of the elongated rod section 44 into the drain 88, the drain cleaning device 40 is rotated by the drill 70, thus winding into and capturing the clogging debris. The particular construction of the hook elements on the tip section 46 allows the debris to be collected and grabbed by the drain cleaning device 40. After grabbing the clogging debris, the device 40 is removed from the drain 88.

In one or more embodiments, the drain cleaning device 40 is configured to be discarded after being used to remove the debris from the drain pipe 90. In other words, the drain cleaning device 40 is disposable, and is designed for single cleaning of a drain. The used drain cleaning device 40 with the collected debris can be safely and environmentally discarded. Then, a new drain cleaning device 40 can be attached to the power tool adapter 10, and used to remove hair from another clogged drain.

Figure 15:
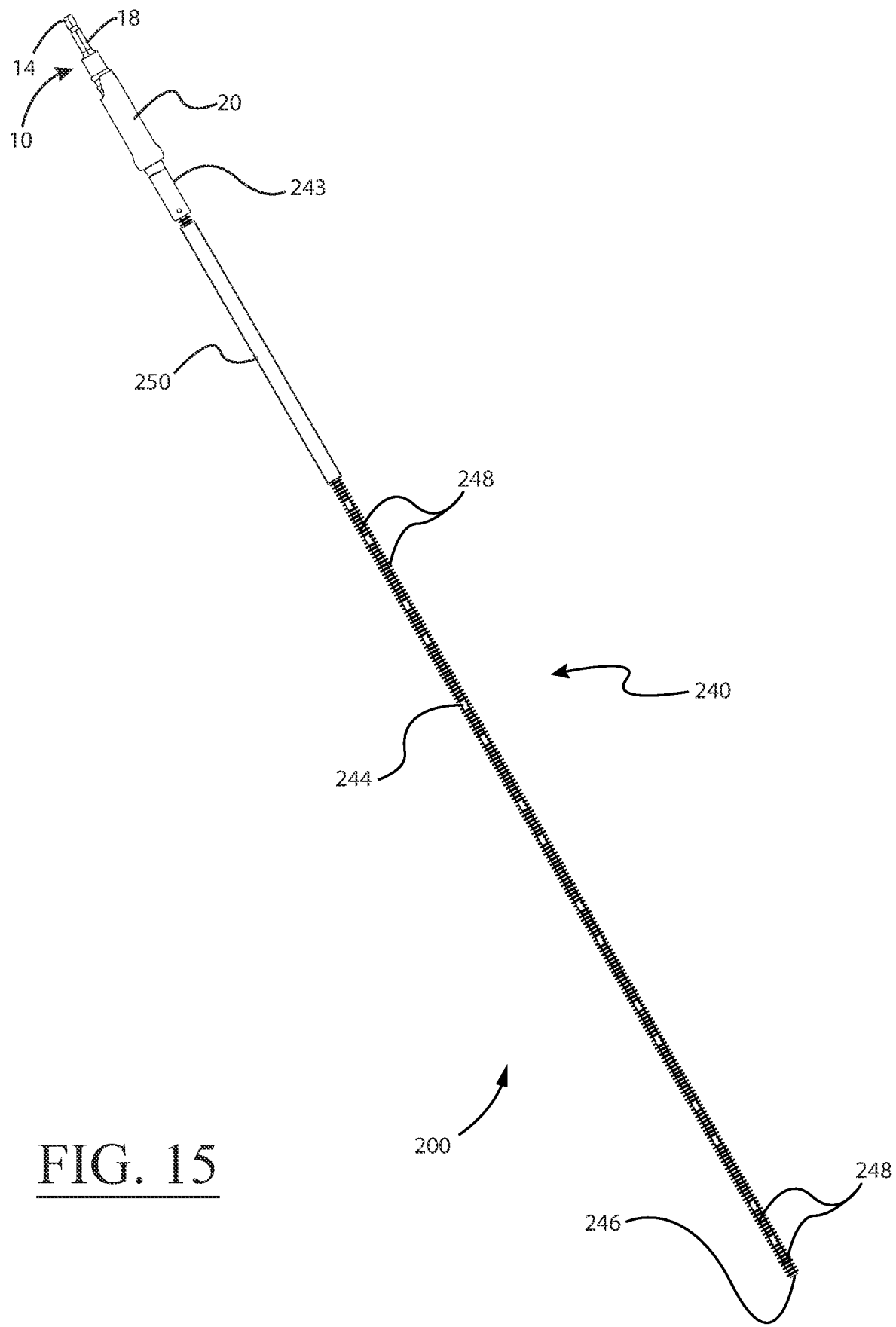
FIG. 15 is a perspective view of a drain cleaning assembly, according to a second illustrative embodiment of the invention, wherein the drain cleaning assembly includes a power tool adapter and a second type of drain cleaning device.

A second illustrative embodiment of a drain cleaning assembly is seen generally at 200 in FIGS. 15-17. FIG. 15 shows a perspective view of the illustrative drain cleaning assembly 200 including the reusable power tool adapter 10 and a disposable drain cleaning device 240. Referring to these figures, it can be seen that, in many respects, the illustrative embodiment of FIGS. 15-17 is similar to that of the illustrative embodiment of FIGS. 1-7. Moreover, many elements are common to both such embodiments. For the sake of brevity, the elements that the illustrative embodiment of FIGS. 15-17 has in common with the embodiment of FIGS. 1-7 will not be discussed in detail because these components have already been described above.

Figure 18:
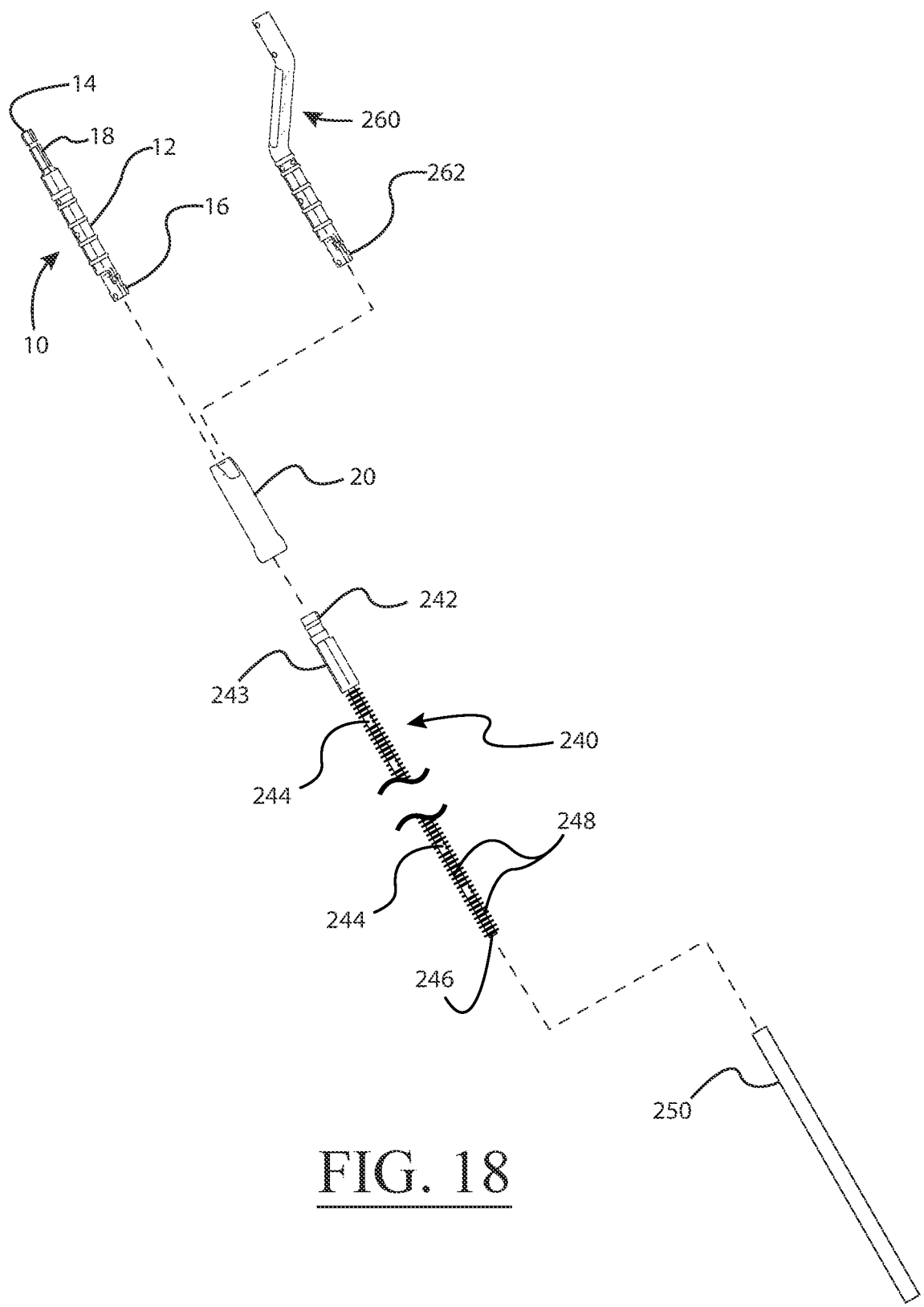
FIG. 18 is an exploded partial perspective view of the drain cleaning assembly of FIG. 15, wherein a handle member that is interchangeable with the power tool adapter is further illustrated.

Similar to that described above for the first illustrative embodiment, the disposable drain cleaning device 240 of the second illustrative embodiment is attached to the power tool adapter 10 by engagement of the proximal end portion 242 (i.e., the end that is closest to the person when operating the device) of the drain cleaning device 240 fully engaging with the distal end portion 16 of the power tool adapter 10 (see FIG. 18). A slidable sleeve member 20 is shown in the engaged position and the drain cleaning device 240, as shown in FIG. 15, is in the fully engaged configuration. The sleeve member 20 in this engaged position ensures that the drain cleaning device 240 and power tool adapter 10 are fully engaged, i.e., interlocked at their corresponding ends, and the device is ready for use, such as for clearing a clogged drain pipe or for other similar pipe-cleaning functions.

In the second illustrative embodiment, with reference to FIGS. 15-17, it can be seen that the drain cleaning device 240 generally comprises an elongated rod section 244 having a first end with connector section 243 and a second end with tip 246. The first end of the elongated rod section 244 is oppositely disposed relative to the second end of the elongated rod section 244. The elongated rod section 244 further includes the plurality of hook elements 248 projecting outwardly from the elongated rod section 244. In the illustrative embodiment, the plurality of hook elements 248 are disposed around a periphery of the elongated rod section 244 and along a length of the elongated rod section 244 between the first end and the second ends (see FIG. 15).

In the illustrative embodiment, the plurality of hook elements 248 on the elongated rod section 244 are in the form of a plurality of injection-molded micro-hook elements configured to grab and collect the hair and/or debris from the drain pipe being cleaned. In the illustrative embodiment, the plurality of injection-molded micro-hook elements may be in the form of inverted J-shaped projections and T-shaped projections protruding outwardly from the elongated body of the cleaning device 240. The plurality of injection-molded micro-hook elements may be disposed on opposite first and second sides of the elongated body of the cleaning device 240. The injection-molded micro-hook inverted J-shaped elements that are disposed on the first side and the second side of the elongated body of the cleaning device may be arranged in rows where every other injection-molded micro-hook element points in an opposite direction (i.e., the injection-molded micro-hook elements point in alternating directions along the length of the elongated body—see e.g., FIGS. 10-12 in U.S. Pat. No. 10,857,577, the entire disclosure of which is incorporated herein by reference).

In other embodiments, the elongated rod section further comprises a central core portion and an outer covering bonded to the central core portion. The outer covering is formed from a hook material strip, and the hook material strip comprises the plurality of hook elements of the elongated rod section. In these other embodiments, the hook material strip may be made from a hook side of a hook-and-loop fastener material (e.g., made from the hook portion of Velcro®—see e.g., FIGS. 5 and 9 of U.S. Pat. No. 10,857,577), rather than being injection-molded micro-hook elements.

Figure 19:
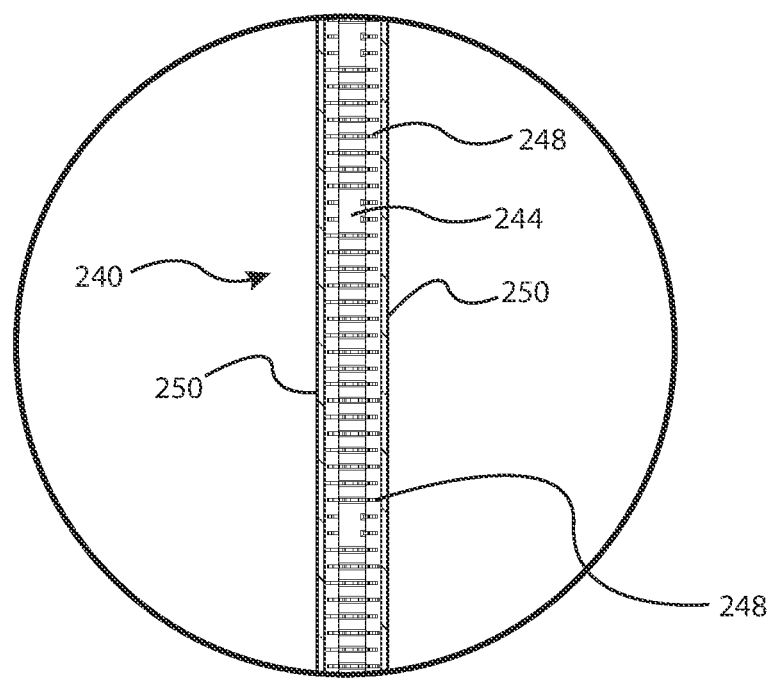
FIG. 19 is a longitudinal sectional view cut through an elongated rod section and elongated sleeve member of the drain cleaning device of FIG. 15, wherein the section is generally cut along the cutting-plane line B-B in FIG. 16.

Referring to FIGS. 15, 18, and 19, in the second illustrative embodiment, the drain cleaning device 240 further comprises an elongated sleeve member 250 rotatably disposed on a longitudinal portion of the elongated rod section 244. The elongated sleeve member 250 is configured to be grasped by a hand of a user during the spinning of the drain cleaning device 240 by the rotary motion input device (e.g., a drill 70) so as to help stabilize the drain cleaning device 240. The drain cleaning device is configured to be rotated relative to the elongated sleeve member 250 while the elongated sleeve member 250 is held stationary by the hand of the user (e.g., similar to the adapter sleeve member 20 described above). In the illustrative embodiment, the elongated sleeve member 250 may be formed from a piece of thin extruded plastic with a slit, or from a thin molded plastic sleeve. In the illustrative embodiment, the elongated rod section 244 may have a length that is approximately 30 inches, and the elongated sleeve member 250 may have a length that is approximately 8 inches.

In the illustrative embodiment, the drain cleaning devices 240 are preferably disposable and can be made of any suitable disposable, recyclable or biodegradable material (e.g., a suitable plastic), such as polyethylene, polystyrene, polycarbonate, acrylic polymer, or nylon. The power tool adapter 10 is preferably reusable and can be made of a suitably durable material (e.g., a suitable plastic) to withstand repeated engagement and disengagement with drain cleaning devices 240 and repeated use.

Referring again to FIG. 18, in the second illustrative embodiment, rather than using the power tool adapter 10 with the drain cleaning device 240, the proximal end portion 242 of the disposable drain cleaning device 240 may be alternatively connected to the distal end portion 262 of a manual handle 260 that allows a user to manually rotate the drain cleaning device 240 without the use of a power tool. Advantageously, in the illustrative embodiment, the proximal end portion 242 of the disposable drain cleaning device 240 may be interchangeably connected with either the distal end portion 16 of the power tool adapter 10 or the distal end portion 262 of a manual handle 260 so that a user may select either powered or manual rotation of the drain cleaning device 240. Like the power tool adapter 10, the manual handle 260 is preferably reusable and can be made of a suitably durable material (e.g., a suitable plastic) to withstand repeated engagement and disengagement with drain cleaning devices 240 and repeated use.

It is readily apparent that the aforedescribed power tool adapter 10 for a drain cleaning device offers numerous advantages. For example, the power tool adapter 10 enables a user to utilize the power of a power tool for rotating the drain cleaning device 40, 240 so as to clear sink and tub drain clogs, rather than having to manually manipulate the device 40, 240 by hand. As such, when powered by a drill or other similar rotary motion input device, the drain cleaning assembly 100, 200 effectively cleans a bathroom drain or other type of drain by unblocking the drain of accumulated hair and other debris. The drain cleaning assembly 100, 200 may be used for cleaning drains by removing hair and other debris that is collected in the upper portion of the drain where stopper or strainer mechanisms and other obstructions occur or collected anywhere along the drain pipe down to the bottom elbow bends of the drain where hair and other debris has collected (e.g., in the drain trap). In addition to saving users time and effort, the power tool adapter 10 described herein that is used in conjunction with the drain cleaning device 40, 240 provides the strength and mobility that some disabled users may need to do this common household task rather than calling in a professional.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A power tool adapter system for a drain cleaning device, the power tool adapter system comprising:
   an adapter body having a proximal end portion and a distal end portion, the proximal end portion of the adapter body being oppositely disposed relative to the distal end portion of the adapter body;
   a manual handle having a proximal end portion and a distal end portion, the proximal end portion of the manual handle being oppositely disposed relative to the distal end portion of the manual handle;
   wherein the distal end portion of the adapter body is configured to be coupled to a proximal end portion of a drain cleaning device, the drain cleaning device having a plurality of protruding elements disposed thereon, the plurality of protruding elements configured to grab and collect debris from a drain pipe;
   wherein the proximal end portion of the adapter body is configured to be coupled to a powered rotary motion input device that is sufficient to rotate the plurality of protruding elements of the drain cleaning device about a rotational axis so as to grab and collect the debris from the drain pipe; and
   wherein the distal end portion of the manual handle is configured to be coupled to the proximal end portion of the drain cleaning device so that the drain cleaning device is able to be rotated by a selected one of the powered rotary motion input device and the manual handle, thereby enabling a user to select either powered or manual rotation of the drain cleaning device.

2. The power tool adapter system according to claim 1, wherein the proximal end portion of the adapter body comprises a shank section for being inserted into a recess of the powered rotary motion input device.

3. The power tool adapter system according to claim 2, wherein the powered rotary motion input device for rotating the drain cleaning device is selected from the group consisting of: (i) a drill, (ii) a screwdriver, (iii) a power drill, and (iv) a power screwdriver.

4. The power tool adapter system according to claim 2, wherein the shank section at the proximal end portion of the adapter body is in a form of a drill bit shank section for being inserted into a drill chuck recess.

5. The power tool adapter system according to claim 4, wherein the drill bit shank section has a generally hexagonal or round cross-sectional shape.

6. The power tool adapter system according to claim 1, wherein the distal end portion of the adapter body comprises one or more recesses formed therein that are configured to interlock with one or more corresponding protrusions on the proximal end portion of the drain cleaning device.

7. The power tool adapter system according to claim 6, further comprising an adapter sleeve member that is slidable along a length of the adapter body between (i) a disengaged position where the drain cleaning device is able to be released from the power tool adapter, and (ii) an engaged position where the distal end portion of the adapter body is locked into engagement with the proximal end portion of the drain cleaning device.

8. The power tool adapter system according to claim 7, wherein, in the engaged position of the adapter sleeve member, the adapter sleeve member is rotatably disposed about the adapter body, the adapter sleeve member configured to be grasped by a hand of the user during the spinning of the drain cleaning device by the powered rotary motion input device so as to help stabilize the drain cleaning device, the drain cleaning device being configured to be rotated relative to the adapter sleeve member while the adapter sleeve member is held stationary by the hand of the user.

9. The power tool adapter system according to claim 1, wherein the distal end portion of the adapter body comprises a first partial cylinder section and the proximal end portion of the drain cleaning device comprises a second partial cylinder section, the first partial cylinder section on the distal end portion of the adapter body configured to engage with the second partial cylinder section on the proximal end portion of the drain cleaning device such that a generally complete cylinder section is formed.

10. The power tool adapter system according to claim 1, wherein the distal end portion of the adapter body is configured to be removably coupled to the proximal end portion of the drain cleaning device such that the drain cleaning device is able to be replaced after being used to remove the debris from the drain pipe.

11. The power tool adapter system according to claim 10, wherein the drain cleaning device is configured to be discarded after being used to remove the debris from the drain pipe.

12. The power tool adapter system according to claim 10, wherein the drain cleaning device further comprises an elongated rod section having a first end and a second end, the first end of the elongated rod section being oppositely disposed relative to the second end of the elongated rod section, and the elongated rod section further includes the plurality of protruding elements projecting outwardly from the elongated rod section, the plurality of protruding elements being disposed at least partially around a periphery of the elongated rod section and along at least a portion of a length of the elongated rod section between the first end and the second end.

13. The power tool adapter system according to claim 12, wherein the elongated rod section further comprises a central core portion and an outer covering bonded to the central core portion, the outer covering formed from a hook material strip, the hook material strip comprising the plurality of protruding elements of the elongated rod section, and the hook material strip being made from a hook side of a hook-and-loop fastener material.

14. The power tool adapter system according to claim 12, wherein the plurality of protruding elements on the elongated rod section comprise a plurality of injection-molded micro-hooks.

15. The power tool adapter system according to claim 14, wherein at least some of the plurality of injection-molded micro-hooks are in the form of inverted J-shaped projections protruding outwardly from a central core portion of the elongated rod section of the drain cleaning device.

16. The power tool adapter system according to claim 14, wherein at least some of the plurality of injection-molded micro-hooks are in the form of T-shaped projections protruding outwardly from a central core portion of the elongated rod section of the drain cleaning device.

17. The power tool adapter system according to claim 12, wherein the drain cleaning device further comprises an elongated sleeve member rotatably disposed on a longitudinal portion of the elongated rod section, the elongated sleeve member configured to be grasped by a hand of the user during the spinning of the drain cleaning device by the powered rotary motion input device so as to help stabilize the drain cleaning device, the drain cleaning device being configured to be rotated relative to the elongated sleeve member while the elongated sleeve member is held stationary by the hand of the user.

18. A power tool adapter system for a drain cleaning device, the power tool adapter system comprising:
   an adapter body having a proximal end portion and a distal end portion, the proximal end portion of the adapter body being oppositely disposed relative to the distal end portion of the adapter body, the proximal end portion of the adapter body comprises a shank section for being inserted into a recess of a powered rotary motion input device, the shank section having a generally hexagonal cross-sectional shape;
   a manual handle having a proximal end portion and a distal end portion, the proximal end portion of the manual handle being oppositely disposed relative to the distal end portion of the manual handle;
   wherein the distal end portion of the adapter body is configured to be coupled to a proximal end portion of a drain cleaning device, the drain cleaning device having a plurality of protruding elements disposed thereon, the plurality of protruding elements configured to grab and collect debris from a drain pipe;
   wherein the shank section of the adapter body is configured to be coupled to the powered rotary motion input device that is sufficient to rotate the plurality of protruding elements of the drain cleaning device about a rotational axis so as to grab and collect the debris from the drain pipe; and
   wherein the distal end portion of the manual handle is configured to be coupled to the proximal end portion of the drain cleaning device so that the drain cleaning device is able to be rotated by a selected one of the powered rotary motion input device and the manual handle, thereby enabling a user to select either powered or manual rotation of the drain cleaning device.

19. The power tool adapter system according to claim 18, wherein the powered rotary motion input device for rotating the drain cleaning device is selected from the group consisting of: (i) a drill, (ii) a screwdriver, (iii) a power drill, and (iv) a power screwdriver.

20. The power tool adapter system according to claim 18, wherein the shank section at the proximal end portion of the adapter body is in a form of a drill bit shank section for being inserted into a drill chuck recess.

\* \* \* \* \*